US 8,424,917 B2

(12) United States Patent
Christodoulou et al.

(10) Patent No.: US 8,424,917 B2
(45) Date of Patent: Apr. 23, 2013

(54) ELECTROFUSION FITTING

(75) Inventors: Mario John Christodoulou, Nottinghamshire (GB); Lawrence Adam Faulkner Richards, Warwickshire (GB); Derek John Muckle, Leicestershire (GB)

(73) Assignee: Radius Systems Limited, Derbyshire (GB)

( * ) Notice: Subject to any disclaimer, the term of this patent is extended or adjusted under 35 U.S.C. 154(b) by 393 days.

(21) Appl. No.: 12/669,455

(22) PCT Filed: Jul. 16, 2008

(86) PCT No.: PCT/GB2008/050580
§ 371 (c)(1),
(2), (4) Date: Apr. 26, 2010

(87) PCT Pub. No.: WO2009/010800
PCT Pub. Date: Jan. 22, 2009

(65) Prior Publication Data
US 2010/0207382 A1    Aug. 19, 2010

(30) Foreign Application Priority Data

Jul. 17, 2007  (GB) .................................. 0713814.2
Dec. 7, 2007   (EP) .................................. 07254750

(51) Int. Cl.
*F16L 13/02*          (2006.01)
(52) U.S. Cl.
USPC ........................ 285/21.2; 285/21.1
(58) Field of Classification Search ................. 285/21.1, 285/21.2; 264/272.15
See application file for complete search history.

(56) References Cited

U.S. PATENT DOCUMENTS 3,506,519 A    4/1970  Blumenkranz
4,274,662 A  * 6/1981  de Groot et al. ............. 285/21.1
(Continued)

FOREIGN PATENT DOCUMENTS

| DE | 4437407 A1 | 4/1996 |
|----|------------|--------|
| GB | 891392 A   | 3/1962 |
| WO | 01/20219 A1 | 3/2001 |

OTHER PUBLICATIONS

International Preliminary Report on Patentability, mailed Jan. 28, 2010, issued in corresponding International Application No. PCT/GB2008/050580, filed Jul. 16, 2008.

(Continued)

*Primary Examiner* — Aaron Dunwoody
(74) *Attorney, Agent, or Firm* — Christensen O'Connor Johnson Kindness PLLC

(57) ABSTRACT

A moulded electrofusion fitting for connection to a plastics pipeline comprises a hollow body formed with a tubular opening that has a longitudinal axis and is adapted to receive and end of the pipeline as a close sliding fit. An electrofusion element is formed in the internal surface in the opening, spaced from its end. Fingers are on the end of the opening, circumferentially spaced around the opening and separated by slots between them. Cam surfaces in the form of ribs are defined on the fingers, and a grip ring is received on the fingers and includes wedge elements in the form of grooves. These are adapted to fit the ribs so that, when a pipeline is inserted in the opening and the grip ring is rotated about said axis, the ribs and grooves engage to press the fingers radially inwardly against the reaction of the grip ring, whereby said pipe is gripped by said grip ring and centralized in the opening. The grip ring may be integrated with a terminal pin, a bayonet slot of the grip ring accommodating the terminal pin, a shroud boss formed on the grip ring around the base of the bayonet slot.

11 Claims, 8 Drawing Sheets

U.S. PATENT DOCUMENTS

| | | | | |
|---|---|---|---|---|
| 4,927,183 A * | 5/1990 | Steinmetz et al. | ........... | 285/21.2 |
| 4,958,857 A * | 9/1990 | Sixsmith | ...................... | 285/21.2 |
| 5,252,810 A * | 10/1993 | Trosch et al. | .................. | 219/544 |
| 5,375,889 A * | 12/1994 | Nakashiba et al. | .......... | 285/21.2 |
| 5,601,315 A * | 2/1997 | Bunger et al. | ............... | 285/21.2 |
| 5,687,996 A * | 11/1997 | Steinmetz et al. | ........... | 285/21.1 |
| 6,193,834 B1 * | 2/2001 | Smith | ........................ | 156/273.9 |
| 6,375,226 B1 * | 4/2002 | Dickinson et al. | ........... | 285/21.2 |
| 8,201,573 B2 * | 6/2012 | Christodoulou et al. | .. | 137/15.12 |
| 2010/0207382 A1 * | 8/2010 | Christodoulou et al. | .. | 285/288.5 |
| 2010/0282337 A1 * | 11/2010 | Christodoulou et al. | ..... | 137/318 |

OTHER PUBLICATIONS

International Search Report, mailed Sep. 25, 2008, issued in corresponding International Application No. PCT/GB2008/050580, filed Jul. 16, 2008.

* cited by examiner

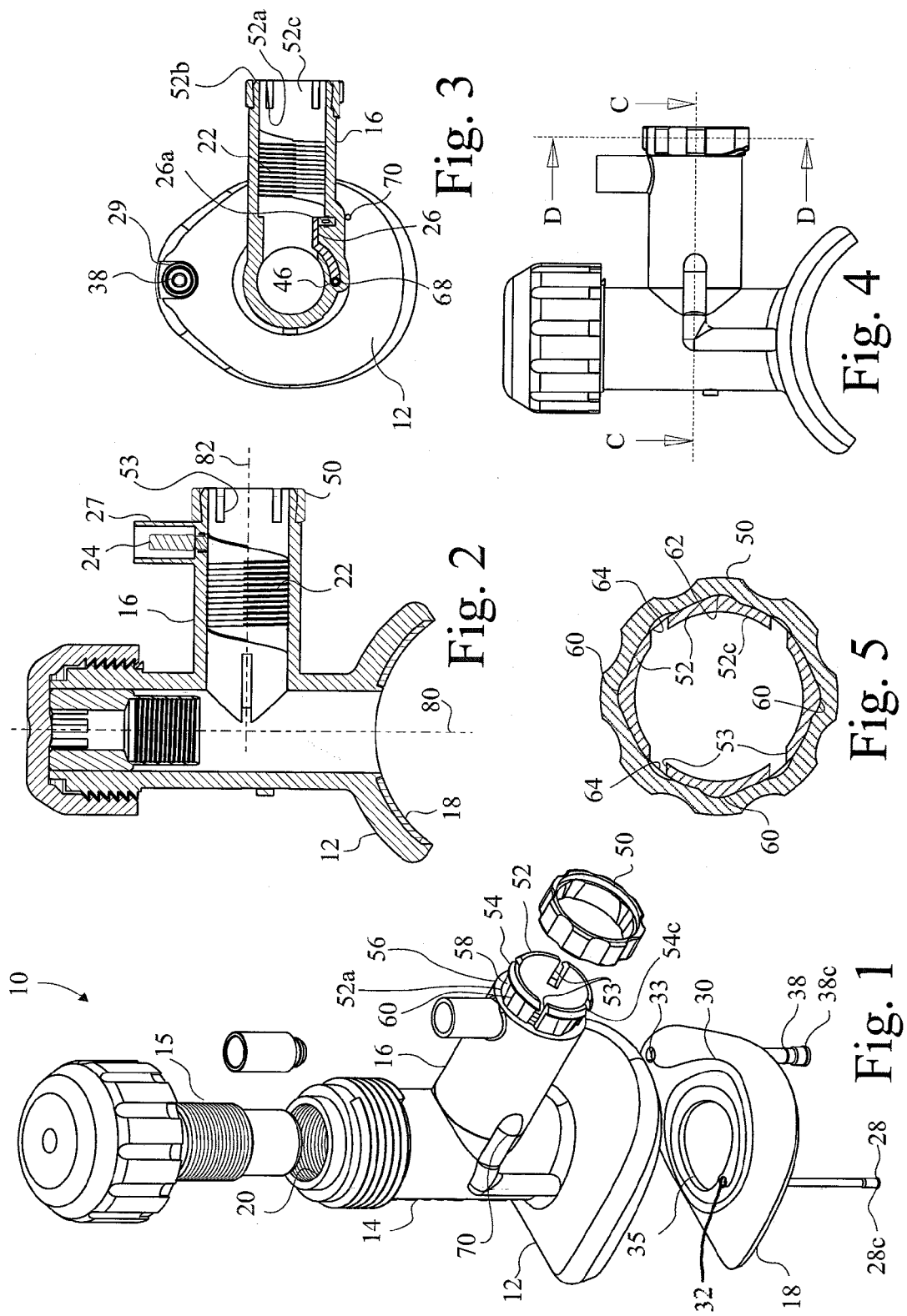

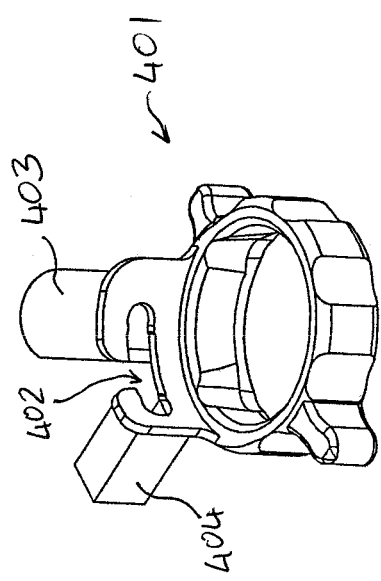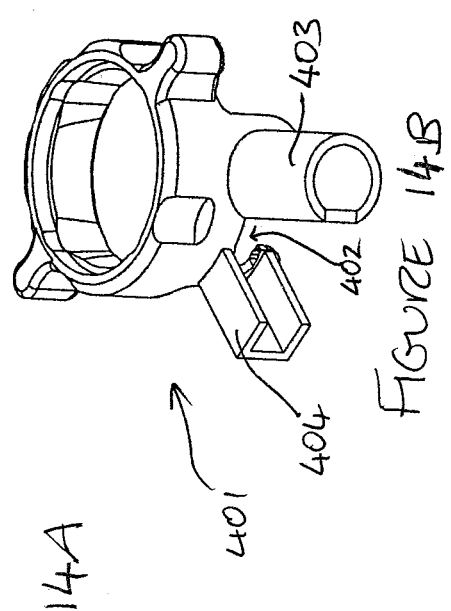

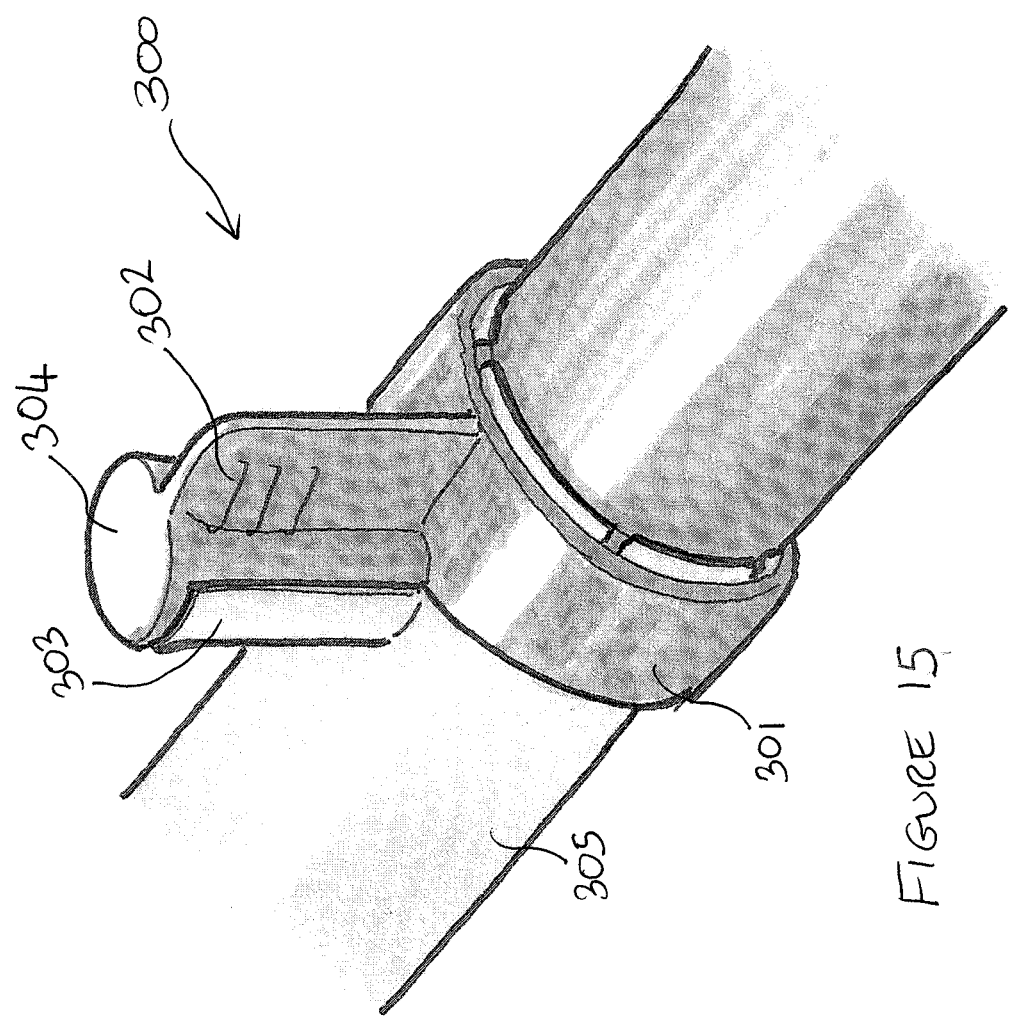

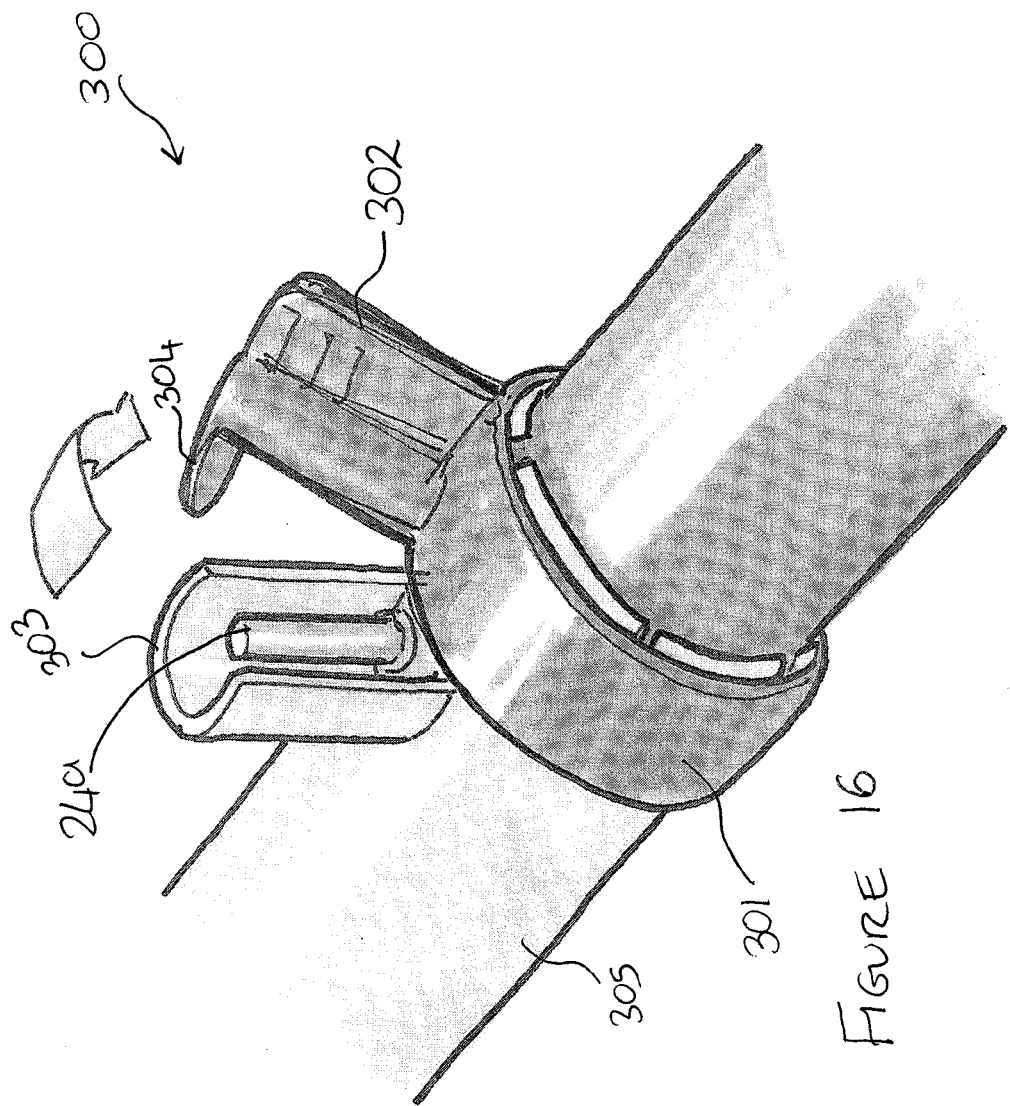

ELECTROFUSION FITTING

This invention relates to the field of electrofusion fittings. Such fittings are employed to connect together plastics pipelines. They come in many kinds, from simple, inline couplers for two pipes to be joined end-to-end, to more complex fittings such as tapping tees to connect a branch service pipe to a mains pipe.

BACKGROUND

Generally, electrofusion fittings comprise one or more tubular openings adapted to receive a pipe to be connected to the fitting. The tubular opening has an electrofusion element embedded in the internal surface of the opening that lies against the pipe when the pipe is inserted in the fitting. The electrofusion element frequently comprises a coil of resistance wire. The coil generally begins well inside the mouth of the opening and ends before the end of the fully-inserted pipe. Usually a rib or the like forms a stop in the opening, determining when the pipe is fully inserted once its end abuts the stop. This ensures that the element is fully covered on both sides, by the pipe, on the one hand, and by the fitting on the other. When the electrofusion element is energised, the plastics material of the pipe and fitting adjacent the electrofusion element melts and fuses. Both the pipe and the fitting are sufficiently thick, and being made of plastics material which is a poor conductor of heat, so that the liquefied plastics does not penetrate out through the fitting, or in through the wall of the pipe. Moreover, because there is overlap of fitting at one end of the coil and pipe at the other, the melting does not penetrate to the end of the fitting or to the end of the pipe. So the melting is contained. Moreover, the plastics expands somewhat on melting, so that there is an increase in pressure in the melting zone that aids fusion. An aperture is sometimes provided in the fitting communicating with the bore thereof in the region of the coil, so that melted plastics is exuded through the aperture to indicate melting and probable completion of the weld.

When joints are made, they are not always successful. A successful joint is one where the fitting and pipe are fused in a ring around the fluid passage of the pipe, and over a considerable length of the pipe so that a leakage or fracture path, if one develops, has to penetrate a long distance. This applies both to a tubular fitting and to a saddle fitting. There can be a number of reasons why a joint is not successful, and sometimes the fact that it is unsuccessful is not immediately apparent. Of course, mating surfaces of the fitting and pipe in the region of the electrofusion element have to be clean and "unskinned" (that is, having no oxide layer formed on the surface), otherwise proper fusion, which involves surface mixing between the two parts, may be inhibited. Also, the mating surfaces must lie close to one another over the entire fusion range, otherwise they may be too far apart for the liquefied plastics to meet over a long length of the complete circumference of the joint. Finally, there should be no relative movement between the pipe and fitting during the fusion process. If movement occurs, this can lead to the pipe not covering the fusion zone and thus weakening the joint.

Measures already exist to overcome these problems. For example, it is normal to scrape pipes to remove oxide layers, or provide them with a plastics surface skin that is peeled off prior to fusion to expose virgin plastics material. The present invention is not concerned with this aspect, however. It is also known to clamp pipes and fittings together prior to fusion, so that the possibility of movement is avoided. It is an object of the present invention to improve on this arrangement. In particular, it is desirable to provide a fitting where angular or axial misalignment between a pipeline and fitting is minimised, since this is another reason for some unsuccessful joints. Given that movements of the pipe at critical times, or occasions when the pipe is not sufficiently central, are rare, pipe failures are also rare. However, this means that users in the field tend to be complacent about employing the cumbersome clamping arrangements hitherto available. Thus an improved arrangement would be desirable.

BRIEF SUMMARY OF THE DISCLOSURE

In accordance with a first aspect of the present invention there is provided a moulded electrofusion fitting for connection to a plastics pipeline, comprising:
- a hollow body formed with a tubular opening that has a longitudinal axis and is adapted to receive an end of the pipeline inserted in the direction of said axis as a close sliding fit against an internal surface of the opening;
- an electrofusion element formed in the internal surface in the opening spaced from its end;
- fingers on the end of the opening circumferentially spaced around the opening and separated by slots between them;
- cam surfaces defined on the fingers; and
- a grip ring received on the fingers and including corresponding wedge elements adapted to fit said cam surfaces of the fingers,
- wherein, when a pipeline is inserted in the opening and the grip ring is rotated about said axis, said wedge and cam surfaces engage to press said fingers radially inwardly against the reaction of said grip ring whereby said pipe is gripped by said fingers.

Preferably, the electrofusion element terminates before a stop formed in the opening, which stop is adapted to limit insertion of the pipeline in the opening. Preferably, a circumferential flange is formed around the fingers to retain said grip ring on the end thereof.

The grip ring may be snapped over said flange to assemble the fitting, temporarily inwardly deflecting the fingers to permit such insertion. Indeed, said flange may have a surface lying in a radial plane with respect to said axis facing a corresponding surface of said grip ring when disposed on said, whereby said grip ring cannot be withdrawn from the fingers, at least not without difficulty involving inwardly deflecting all of the fingers simultaneously.

Preferably, said wedge and cam surfaces are mutually engaging cylindrical or conical ribs on the fingers and grooves in the grip ring, which ribs and grooves are parallel said longitudinal axis.

Preferably, in a clockwise direction of rotation of said grip ring with respect to said opening, looking in the direction of said opening, the inclination of said ribs and groove with respect to the tangent of the circle centred on said axis on which the facing surfaces of the fingers and grip ring otherwise lie, is less than in the anti-clockwise direction.

Conveniently, said ribs and grooves are arranged so that the deflection of the fingers on rotation of the grip ring is least at a proximal root of the fingers compared with a distal end of the fingers. For this purpose, said ribs and grooves may be conical surfaces. Alternatively, said ribs and grooves may be cylindrical surfaces with the axis of the cylinder inclined with respect to said longitudinal axis.

Said conical or cylindrical surface is preferably modified to provide said less inclination in said clockwise direction.

Facing surfaces of the grip ring and fingers between said ribs and grooves are preferably circular cylindrical. Shallow stop-grooves may be provided in said grip ring into which said ribs engage after rotation of the grip ring disengaging said ribs from said grooves. This tells the user that full engagement of the cam/wedges surfaces has been achieved by virtue of a subtle release of mechanical tension. Alternatively a positive stop may be used to limit travel.

There are conveniently four fingers. Moreover, the slots between said fingers may all be parallel with each other, whereby they may be formed by a mould splitting in half in a direction parallel said slots.

Preferably, the electrofusion element commences at a distance from the ends of said fingers. Said distance may be between 0.1 and 2 times the internal diameter of said opening (preferably between 0.75 and 1.25 times). Indeed, preferably, the distance from the ends of the fingers to the stop is between 0.5 and 3 times the internal diameter of said opening (preferably between 2 and 2.5 times). However, the larger end of these ranges are probably only achievable where there are not standards to be complied with, since spigot-type components only provide a certain available length for insertion in electrofusion fittings that may not be adequate to span a substantial length before engagement with the electrofusion element. Moreover, given that one primary purpose of the clamp ring provided by the present invention is to centralise the pipe (or spigot fitting, as the case may be) with respect to the electrofusion element in the fitting, the need for this centralisation diminishes the longer the lead-in is to the electrofusion element. Of course, the other primary purpose of the clamp ring is to inhibit movement of the inserted pipe or spigot into the fitting, either dislodging its proper location or during the solidification phase of the joint process.

According to a second aspect of the invention there is provided a moulded electrofusion fitting for connection to a plastics pipeline or spigot, comprising:
 a hollow body formed with a tubular opening that has a longitudinal axis and is adapted to receive an end of the pipeline/spigot inserted in the direction of said axis as a close sliding fit against an internal surface of the opening;
 an electrofusion element formed in the internal surface in the opening spaced from its end;
 a grip ring including a clamping arrangement wherein, when a pipeline is inserted in the opening and the grip ring is rotated about said axis, said clamping arrangement engages said pipe to minimise movement thereof during electrofusion,
 characterised in that the fitting further comprising at least one radially-protruding terminal pin connected to an end of said electrofusion element, and wherein said grip ring has a bayonet slot for receiving said terminal pin, and an integral upstanding boss that projects radially from said grip ring,
 wherein said bayonet slot permits disposition of the grip ring on the fitting firstly by movement of the grip ring with an axial component whereby the terminal pin enters a mouth of the slot, and secondly by said rotation of the grip ring about said axis to guide said terminal pin through an opening in said upstanding boss.

According to a third aspect of the invention there is provided a moulded electrofusion fitting for connection to a plastics pipeline or spigot, comprising:
 a hollow body formed with a tubular opening that has a longitudinal axis and is adapted to receive an end of the pipeline/spigot inserted in the direction of said axis as a close sliding fit against an internal surface of the opening;
 an electrofusion element formed in the internal surface in the opening spaced from its end;
 a grip ring including a clamping arrangement wherein, when a pipeline is inserted in the opening and the grip ring is rotated about said axis, said clamping arrangement engages said pipe to minimise movement thereof during electrofusion, characterised in that the fitting further comprises
 at least one radially-protruding terminal pin connected to an end of said electrofusion element;
 a first integral upstanding boss that projects radially from said fitting and which at least partially surrounds said terminal pin and is preferably fixed with respect thereto;
 said grip ring having a second integral upstanding boss that projects radially from said grip ring,
 wherein, when aligned together, said first and second upstanding bosses substantially surround said terminal pin so as to prevent connection of an electrical connector thereto; and
 wherein said rotation of said grip ring moves said second upstanding boss away from said first upstanding boss so as to allow access to said terminal pin.

Other features of the invention are defined in the appended claims.

BRIEF DESCRIPTION OF THE DRAWINGS

Embodiments of the invention are further described hereinafter, by way of example, with reference to the accompanying drawings, in which:

FIG. 1 is an exploded perspective view of a tapping tee embodying one aspect of the present invention;

FIG. 2 is a side section of the tapping tee of FIG. 1;

FIG. 3 is a plan section of the tapping tee assembly of FIG. 1, taken along the line C-C in FIG. 4;

FIG. 4 is an end view of the same tapping tee;

FIG. 5 is a section on the line D-D in FIG. 4;

FIGS. 14A and 14B are perspective views of the grip ring of FIG. 13, showing the shrouds in more detail;

FIG. 15 is a perspective view of an inline coupler in accordance with a further embodiment of the present invention, with the terminal pin covered by a shroud; and FIG. 16 shows the inline coupler of FIG. 15, with the terminal pin uncovered.

DETAILED DESCRIPTION

Figure 8:
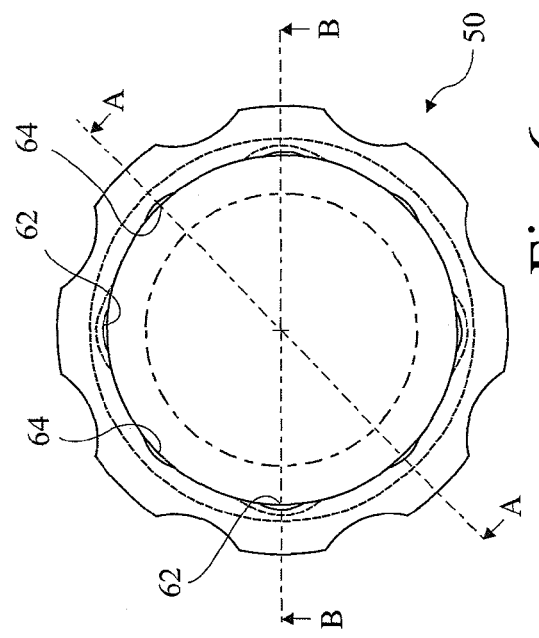
FIG. 8 is a perspective view of the grip ring of FIGS. 6 and 7.

Referring to the embodiment disclosed in FIG. 1, a tapping tee assembly 10 comprises an integrally moulded saddle 12, body 14 and socket 16. The saddle 12 is provided with a saddle-shaped electrofusion element mat 18, which is attached thereto by over-moulding, snap-fit, screws or other fastening means such as terminal stud 38 and electrical connecting pin 28 as described further below. The body 14 has an axially extended screw threaded bore 20, and disposed within the bore, a metal cutter 15 having a screw threaded outer surface that cooperates with the screw thread of the bore 20. The socket 16 is adapted to receive a branch pipe or spigot (not shown) and is provided with an internal tubular spigot electrofusion element 22 (see FIGS. 2 and 3).

An electrofusion element 30, in the form of an electrical resistance wire, is embedded in a spiral track formed on either side of the mat 18, which is a disc of fusible polymer material having central aperture 35, adapted to coincide with the bore 20. The mat 18 is provided with a hole 32 adjacent the aperture 35 and through which the electrofusion element 30 passes from one side of said polymer material to the other. The ends of the wire are led to another hole 33 adjacent the outside rim of the mat 18.

Socket electrofusion element 22 further comprises two electrical connectors in the form of a second electrical stud terminal 24 and a dovetailed anvil 26 (see FIG. 3). The electrical stud 24 and dovetailed anvil 26 are connected to opposite ends of the socket electrofusion element 22, which is wound as a coil in the internal surface of the socket 16. The electrical stud terminal 24 is surrounded by an upstanding boss 27 forming a socket to receive the plug of an electrical connector of a power source. Said dovetailed anvil 26 electrically connects the two electrofusion elements 30,22 via said intermediate connecting pin 28. A similar socket 29 is provided for the stud 38, between terminal pins or studs 24,38 an electrical power source (not shown) may be connected to energise the two electrofusion elements 30,22.

The circuit of the tapping tee assembly 10 comprises the upper and lower components of the electrofusion element 30 embedded in the saddle-shaped electrofusion mat 18 connected in parallel with one another, and in series with the socket electrofusion element 22 of the socket 16. Both pin 28 and stud 38 are provided with heads 28c,38c respectively in order to retain the mat 18 in place.

On the end of the socket 16 is provided a grip ring 50. The end of the socket is formed with four fingers 52 separated from one another by slots 53. The slots are all parallel to enable shell moulds forming the exterior surface features of the tapping tee 10 to form them and yet simply split along a plane including the body 14 and the socket 16 (or at least their respective axes 80,82—see FIG. 2). The fingers have a proximal root end 52a and distal extreme end 52b. The fingers define an end-flange or ring-rib 54 which is chamfered at the ends 52b of the fingers, but is cut squarely at its proximal edge 54c, so as to lie in a plane radial with respect to the axis 82. A rear edge 56 at the root 52a of the fingers 52 is also radial and between that and the rib 54, an annular channel 58 is defined to receive the ring 50. Once the fingers 52 have been deflected inwardly to permit insertion of the ring 50, the fingers snap back, retaining the grip ring in position. The surface of the base of the channel 58 is circular cylindrical, or conical, in either case with axes coincident with the axis 82. But for the features described further below, the ring 50 would be freely rotatable in the channel 58, being a close sliding fit thereon. However, the fingers 52 are provided with ribs 60, and the ring 50 with corresponding grooves 62.

Four each of said ribs and grooves are provided at 90° to each other around the axis 82 and, when they coincide with each other, the internal face 52c of the fingers 52 remains circular cylindrical. Four shallow detent grooves 64 are also provided at 45° angles to the grooves 62.

Grooves 62 and ribs 60 are conical in profile with their cone axes parallel the axis 82 and with their apex pointing at the body 14. When the ring is rotated about axis 82, the ribs and grooves come out of registration, deflecting the fingers 52 inwardly. Because of the coned profile of the ribs and grooves 60 the deflection of the fingers at their distal ends 52b is much greater than their deflection at their roots 52a. This avoids unnecessary shear stresses in the material at the fingers, and, in any event, ensures maximum deflection of the fingers. Without this relief at the roots of the fingers, instead of maximum deflection of the fingers, the roots, in resisting inward deflection would also prevent full inward deflection of the distal ends. Instead, the ring would simply be deflected outwardly more harshly than inevitably occurs in any event.

Figure 7A:
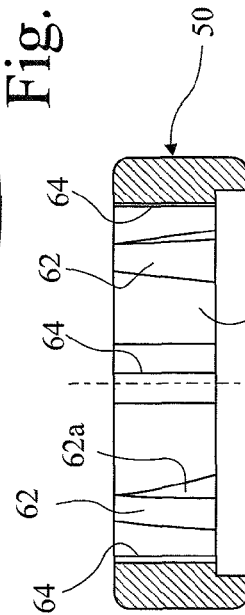
FIGS. 7a and b are sections on the lines A-A and B-B in FIG. 6a respectively.
Figure 7B:
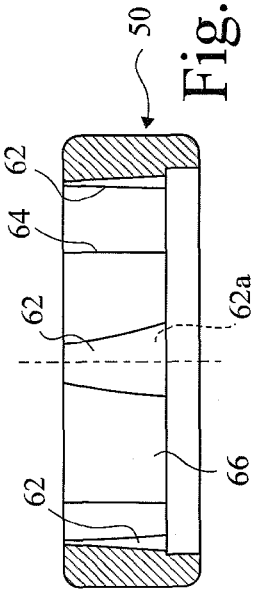
Figure 6B:
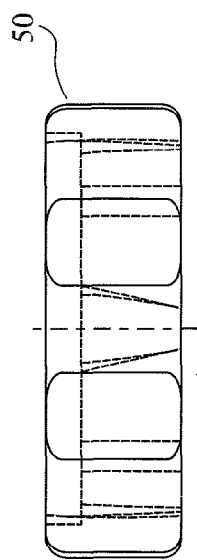
FIGS. 6a and b are a plan (in the direction of Arrow X in FIG. 6b) and side view a grip ring forming part of the tapping tee of FIGS. 1 to 4.
Figure 6A:
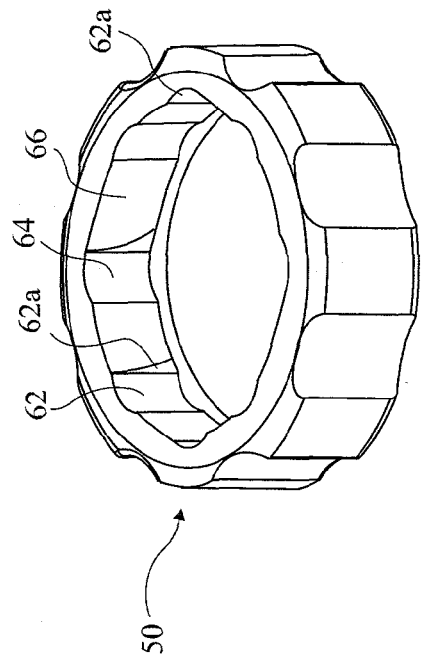

As can be seen in FIGS. 5 and 7a, the groove 62 are provided with a shallow lead-in 62a. This is in the clockwise direction of rotation of the ring 50 on the socket 16 when viewed in the direction of the body 14. This lead-in reduces the angle of attack between the groove 62 and rib 60, which angle is the angle of the mating surfaces to the tangent of the base circular surface of the channel base 58. Consequently, less resistance is experienced by the user in turning the ring clockwise, this being the traditional tightening direction of rotation of screwed fittings. In fact, in the present instance, the ribs and grooves, constituting mating cams and wedges surfaces, could be rotated in either direction, the only purpose being to de-register them so that the ribs 60 press against the internal circular (conical or cylindrical) surface 66 of the ring 50 (the surface 66 is cylindrical as shown). However, rotation in the anticlockwise direction would meet more resistance and would, in any event, be counter-intuitive to most users.

One purpose of the grip ring 50 is to grip and hold pipes inserted in the socket 16 for electrofusion by the element 22. A pipe (not shown) when it is to be connected to the socket 16, is offered up to the outside surface with its end parallel mark 70 formed on the outside of the socket. A mark is then made on the pipe coincident with the ends 52b of the fingers 52 in order to show the required insertion of the pipe in the socket 16. The surface of the pipe is scraped to remove the oxidised skin of the said pipe. The pipe is then inserted until the mark made on the pipe is flush with the ends 52b and at this point the end of the pipe will abut a stop formed by end 26a of the anvil 26 (a rib may also, or instead, be formed to constitute the stop). The grip ring is then rotated to squeeze the fingers 52 against the pipe and clamp it in position.

The fingers, particularly their ends 52b are spaced some distance from the electrofusion element 22 (preferably, but not essentially, at least one pipe diameter). Moreover, the stop is preferably at least 2.25 pipe diameters from the end 52, with the effective end of the electrofusion element being about 2 pipes diameters from the end. The purpose of these arrangements are twofold: first, to provide the normal overlap between pipe end and socket end with respect to the electrofusion element; second, to provide distance from the end of the pipe to the centralising effect of the fingers 52 and grip ring 50 on the pipe with respect to the socket 16, so that the surfaces of the pipe adjacent the electrofusion element 22 are more likely to be parallel the axis 82 in that region. Consequently, two objects are achieved. Firstly, the employment of the grip ring by users in the field is easy, so that even if it is unnecessary to employ in many instances, it will tend to be employed so that even rare failures of the joint formed can be avoided. Secondly, by virtue of the arrangement, misalignment of the pipe with the socket is minimised. Indeed, although having the substantial (ie one pipe diameter) separation between the ends of the fingers and the start of the electrofusion element is desirable, this substantial distance actually reduces the dependency on a centralising grip ring. Thus the grip ring actually has most requirement, from this perspective, when the distance between finger ends and electrofusion element is necessarily small. It is small in many instances of standard electrofusion couplers where an increase in overall length of a coupler is prohibited by the need to accommodate short spigots of other fittings (eg T-pieces).

Manufacture of the tapping tee assembly 10 requires injection moulding of a polymer material within a rigid mould that will not deform under temperatures around the melting point of said polymer material. Since the present invention comprises hollow tubes, a pair of moulding cores must be used within the main mould. The mould is not shown but comprises two or more shell moulds that form the external profile of the tapping tee 10, together with the core moulds, whereby a hollow product of relatively uniform wall thickness is formed.

The component of the main mould that produces the saddle 12 component of the tapping tee assembly 10 comprises a core-pin (not shown) that forms a tunnel bore 68 extending upwards from the saddle 12, through the wall of body 14 parallel the main bore 20. Said element also prevents an eye 46 of said dovetailed anvil 26 from filling with polymer material during moulding. With said saddle-shaped electrofusion mat 18 fixed in place to said saddle 12, the hole 32 through said saddle-shaped electrofusion mat 18 is in line with the saddle end of said tunnel 66. The electrical connecting pin 28 can then be disposed in the tunnel 66 forming an electrical bridge between said saddle electrofusion element 30 of said saddle-shaped electrofusion mat 18 and said eye 46 of the dovetailed anvil 26.

The saddle electrofusion element 18 and socket electrofusion element 22 are composed of a conducting material that produces sufficient heat to melt said fusible polymer material when an electrical current is passed through it, but does not itself melt or break. Said dovetailed anvil 26, electrical studs 24, 38 and electrical connecting pin 28 are composed of a good electrically conducting material that does not produce significant heat when an electric current is passed through it.

Figure 9B:
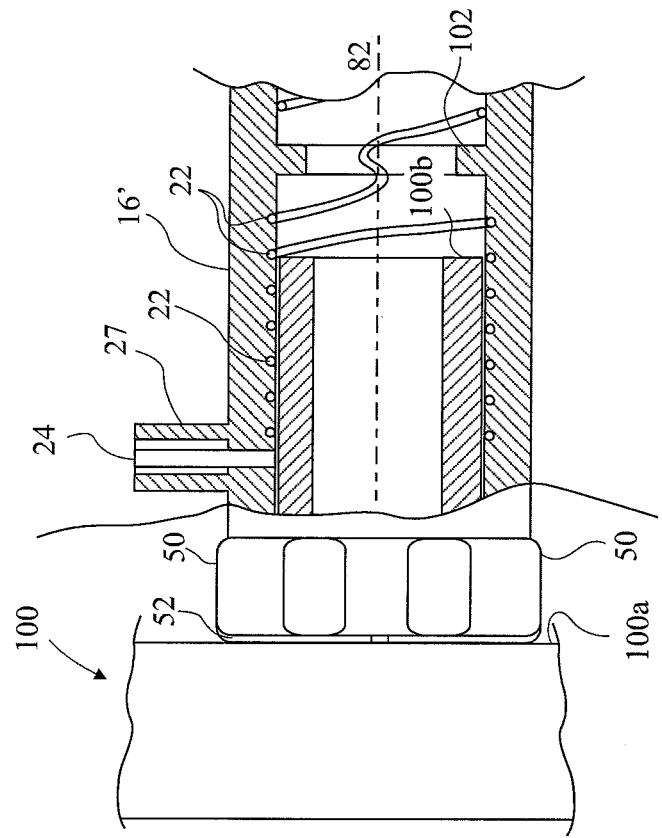
FIGS. 9a and b are a cross sectional side view of a standard length shouldered fitting disposed in a standard (prior art) socket and a partial cross sectional side view of the same standard length shouldered fitting disposed in a socket in accordance with the present invention.
Figure 9A:
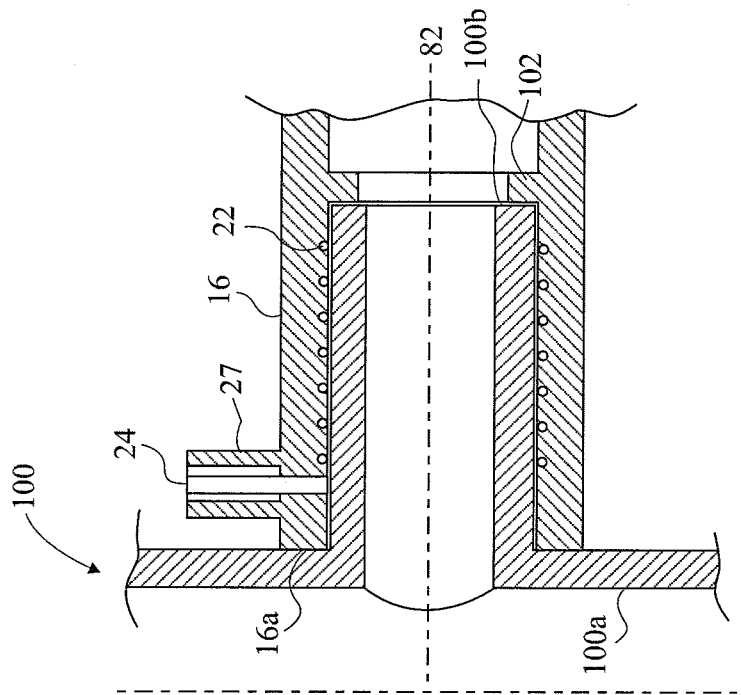

In the embodiment described above, the gripper ring assembly increases the overall length of a standard socket. Although a change in socket length does not affect the connection of a pipe, there are consequences when connecting shouldered spigot fittings designed for use with standard sockets, as shown in FIGS. 9a and b.

When a shouldered fitting 100 is inserted into a standard (prior art) socket 16, a limit is reached when the shoulder 100a abuts the opening 16a of the socket 16 (and/or when the end 100b of the fitting 100 abuts an insertion limiting rib 102 of the socket 16). The shoulder 100a of a shouldered fitting 100, (designed for use with a standard length socket 16, is distanced from the end 100b of the fitting 100 to allow enough length to enter the socket 16 such that its end 100b extends beyond the end of the electrofusion element 22. In the industry, the standard length now accepted for service pipe sizes is 41 mm for the depth of sockets and 42 mm for the length of spigots to be inserted in sockets.

However, when inserted into a socket 16' (see FIG. 9b) provided the additional grip ring 50 of the present invention, the shoulder 100a prevents the fitting 100 entering the socket 16' far enough to allow it to be surrounded by the entire electrofusion element 22. In such cases, only a poor electrofusion joint would be possible. For the grip ring to be used effectively with fittings that have been designed for use with standard sockets, the grip ring assembly must be added to the standard socket such that it does not increase its overall length.

One solution might be to translate the position of the grip ring, thereby reducing the distance between the finger ends and electrofusion element. However, this solution is limited by the obstruction caused by the terminal pin 24 and its upstanding boss 27. The pin 24 cannot be placed over the electrofusion coil 22 without considerable manufacturing difficulty and the danger of shorting out the coil. The entire electrofusion element could be shortened, but this would reduce the effectiveness (i.e. its length) of the fused joint and is also limited by the industry specification.

Figure 10:
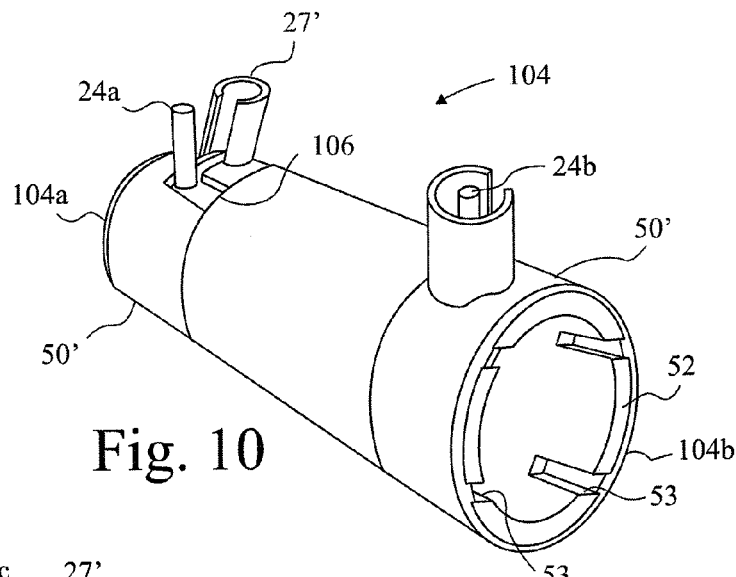
FIG. 10 is a perspective view of an inline coupler in accordance with a further embodiment of the present invention provided with an integral grip ring at each end.

FIG. 10 discloses an inline coupler 104 in accordance with a modified embodiment of the present invention. This coupler is for joining two pipes (not shown) end-to-end, although the principles discussed below apply to any coupler, such as an elbow, T-joint or even a tapping tee. The coupler 104 has two internal electrofusion elements (not shown) connected in series to each other and to two terminal pins 24a,b. The terminal pins 24a,b project radially from the fingers 52 in between the slots 53 that define the fingers 52. Integral grip rings 50' attach over fingers 52 at both ends 104a,b of the inline coupler 104. The integral grip ring 50' is identical to the grip ring 50 described above, except that the integral grip ring 50' further comprises a slot 106, and an integral upstanding boss or shroud 27' coincident therewith. The terms "boss" and "shroud" are used interchangeably in the following description.

Figures 11A, 11B:
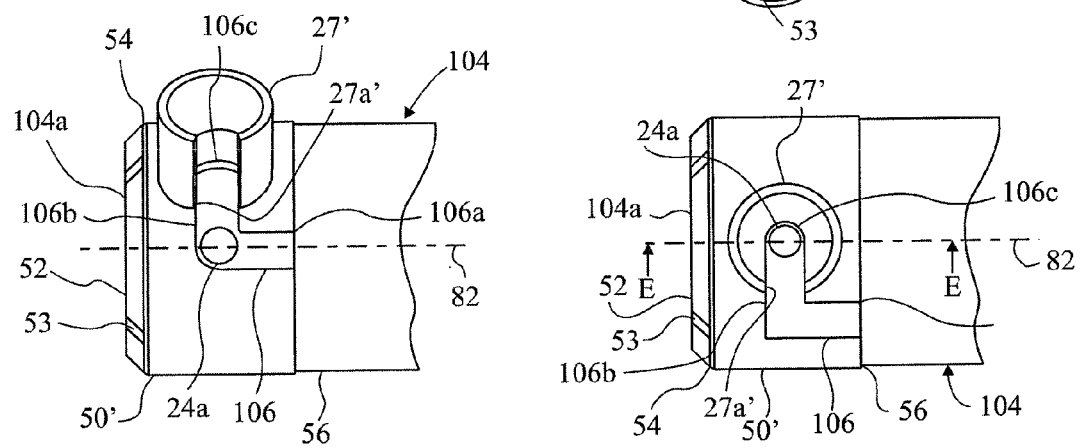
FIGS. 11a and b are top down views of an end of the inline coupler of FIG. 10 with the integral grip ring at different degrees of rotation.

FIGS. 11a and b show how the terminal pin 24a passes through the slot 106 to finally be disposed within the boss 27'. As FIG. 11a shows, the grip ring 50' is placed on the fingers 52 such that the terminal pin 24a passes through mouth 106a of the slot 106. For the grip ring 50' to attach onto the coupler 104, the fingers 52 must deflect inward and the ribs 60 of the fingers 52 must register with the grooves 62 of the grip ring 50' (ribs 60 and grooves 62 not shown in FIGS. 11a,b). The slot 106 is angularly positioned on the grip ring so that this registration of the ribs/grooves 60/62 is achieved when the mouth 106a of the slot engages the pin 24a. The slot continues parallel the longitudinal axis 82 of the coupler until the point where the entire grip ring 50' has passed over the ring-rib 54 on the ends of the fingers 52. Thus the grip ring 50' is restricted to only moving parallel the longitudinal axis 82 by contact between the terminal pin 24a and the sides of the slot 106. Once fully inserted, the ring-rib 54 of the fingers 52 and the shoulder 56 prevents further movement parallel the longitudinal axis 82. At this point, the terminal pin 24a has moved in the slot 106 such that only a transverse part 106b remains as an option for further movement.

Before further movement is made, however, a pipe or spigot of a fitting (neither shown) to be electrofused by the coupler 104 is inserted in the socket end 104a,b. Clockwise rotation of the grip ring 50' (when looking through the open end 104a of the coupler 104 along axis 82) then has two simultaneous effects. The first causes relative movement of the terminal pin 24a along the transverse part 106b of the slot 106 until it passes through an opening 27a' in the boss shroud 27' and abuts the end 106c of the slot 106 within the boss 27'. The second is that the cam surfaces 60, 62 (not shown in FIGS. 10 to 12) engage compressing the fingers 52 against the pipe or spigot both securing and centralising it in the socket 104.

Figure 12:
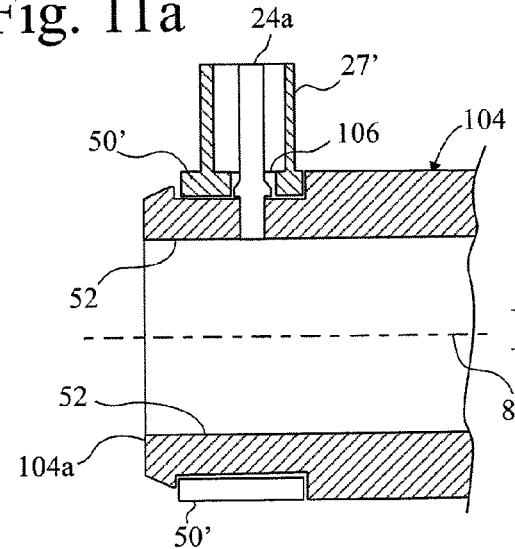
FIG. 12 is a cross sectional side view of a section of the inline coupler along the line E-E in FIG. 11b.

FIG. 12 shows a cross sectional view of the grip ring 50' securely fastened around the terminal pin 24a (as in FIG. 11b). With the upstanding boss 27' integral with the grip ring 50', the grip ring 50' can be incorporated further down the coupler 104, allowing the terminal pin 24a to pass through the slot 106 and be shrouded by the boss 27'. In this embodiment, neither the terminal pin 24a nor boss 27' interferes with the positioning of the grip ring 50' and fingers 52. The integral grip ring therefore allows for the correct fitting of components that would otherwise be prevented from entering the socket sufficiently for a good electrofusion join to be made.

As described above, the grip ring 50' is rotatable between a first position, as shown at the far end of FIG. 10, in which the terminal pin 24a is exposed, and a second position as shown at the near end of FIG. 10 in which the terminal pin 24b is centrally located within the shroud 27'.

In the first position, although the terminal pin 24a is exposed, it is not possible to connect it to an electrical power source because of the close proximity of the shroud 27' which encroaches into the space required to accommodate the power source's electrical connector (not shown).

Therefore, in order to connect the power source, the user is required to rotate the grip ring 50' so that the shroud 27' moves to the position shown at the near end of FIG. 10, in which the terminal pin 24b is centrally located within the shroud 27'. In this position, there is sufficient space between the terminal pin 24b and the shroud 27' to accommodate the connector from the electrical power source. The shroud 27' is suitably sized and shaped to permit this, depending upon the expected type of electrical connector.

In requiring the user to rotate the grip ring before an electrical connection can be made, it is ensured that the user also engages the grip ring against the pipe or spigot to clamp it in place before electrofusion can be initiated.

Figure 13:
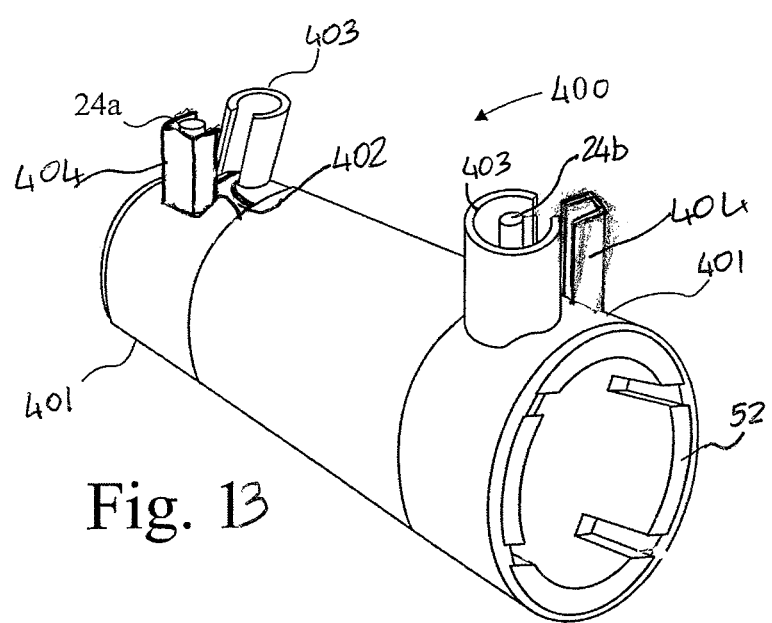
FIG. 13 is a perspective view of an inline coupler in accordance with a further embodiment of the invention, having two shrouds on a grip ring.

FIGS. 13, 14A and 14B show an inline coupler 400 in accordance with a further embodiment of the present invention. Again, this coupler is for joining two pipes (not shown) end-to-end, although the principles discussed below apply to any coupler, such as an elbow, T-joint or even a tapping tee. The coupler 400 has two internal electrofusion elements (not shown) connected in series to each other and to two terminal pins 24a,b. The terminal pins 24a,b project radially from the fingers 52. Integral grip rings 401 attach over fingers 52 at both ends of the inline coupler 400. The integral grip ring 401 is identical to the grip ring 50' described above, except that the integral grip ring 401 comprises a generally T-shaped slot 402, and two integral upstanding bosses or shrouds 403, 404 coincident therewith.

The grip ring 401 is placed on the fitting 400 in a similar manner to that described in relation to FIGS. 11A and 12A above. Slot 402 may be provided with a narrowed portion (not illustrated) to reduce the likelihood of the grip ring 401 being removed again once placed on the fitting.

The grip ring 401 is rotatable between a first position, as shown at the far end of FIG. 13, in which the terminal pin 24a is located within a first shroud 404, and a second position as shown at the near end of FIG. 13 in which the terminal pin 24b is centrally located within the second shroud 403.

In the first position, the terminal pin 24a located within first shroud 404. The shroud 404 is preferably of rectangular cross-section and fits closely around the terminal pin 24a such that it is not possible to connect the terminal pin to an electrical power source because of the close proximity of the shroud 404 which encroaches into the space required to accommodate the power source's electrical connector (not shown).

Therefore, in order to connect the power source, the user is required to rotate the grip ring 401 into the position shown at the near end of FIG. 13, in which the terminal pin 24b is centrally located within the shroud 403. The transverse section of slot 402 guides the travel of the terminal pin between the two shrouds in the manner described above in relation to FIGS. 11A and 11B. When the terminal pin is in transition, intermediate the two shrouds, it is still not possible to connect the terminal pin to an electrical power source because there is insufficient space between the shrouds to accommodate the power source's electrical connector. As the terminal pin approaches the end of its travel in the slot 402 (or indeed in the slot 106 of the embodiment described above), it may pass a narrowed portion of the slot (not illustrated) which deflects outwardly to allow the pin to pass thereby. Once the terminal pin has passed the narrowed portion and is located within the shroud 403, the narrowed portion serves to resist movement of the terminal pin back in the direction from which it has come, thus resisting undesirable removal of the pin from the shroud and undoing of the grip ring's clamping function.

Once the terminal pin is within the second shroud 403, there is sufficient space between the terminal pin 24b and the shroud 403 to accommodate the connector from the electrical power source. The shroud 403 is suitably sized and shaped to permit this, depending upon the expected type of electrical connector.

In requiring the user to rotate the grip ring before an electrical connection can be made, it is ensured that the user also engages the grip ring against the pipe or spigot to clamp it in place before electrofusion can be initiated.

In the embodiments of FIGS. 10-14B, the shrouds 27', 404, 403 are entirely located on the grip rings 50', 401. FIGS. 15 and 16 show an alternative embodiment in which a shroud is partially located on the grip ring and partially located on the fitting (together with the terminal pin).

Referring to FIG. 15, a coupler 300 includes an integral grip ring 301 which has an upstanding partial shroud 302. A terminal pin 24a (not visible in FIG. 15) is located on a fitting 305, the terminal pin being at least partially surrounded by a second upstanding partial shroud 303. As shown in FIG. 15, the upstanding shrouds 302, 303 fit together to surround the terminal pin so as to render it inaccessible for connection to an electrical power source. The partial shroud 302 may be provided with a lid 304 so as to completely enclose the terminal pin, but this is not essential, depending upon the geometry of the partial shrouds. What is important is that the presence of partial shroud 302 in the vicinity of the terminal pin makes it impossible to connect the electrical power source.

In order to connect the power source, the user is required to rotate the grip ring 301, in the direction of the arrow in FIG. 16, so that the partial shroud 302 moves to a position in which the terminal pin 24a can be seen centrally located within the partial shroud 303. The partial shroud 303 is fixed with respect to the terminal pin 24a and has the added advantage of providing protection for the terminal pin during transport and storage of the fitting, before use. In the position illustrated in FIG. 16, there is sufficient space between the terminal pin 24a and the partial shroud 303 to accommodate the connector from the electrical power source, now that the partial shroud 302 has been moved out of the way. The shroud 303 is suitably sized and shaped to permit this, depending upon the expected type of electrical connector. Again, in requiring the user to rotate the grip ring before an electrical connection can be made, it is ensured that the user also engages the grip ring against the pipe or spigot to clamp it in place before electrofusion can be initiated.

Although the inline couplers of FIGS. 10-16 have been illustrated in conjunction with the above-described grip ring (i.e. having wedges and cam surfaces), it will be appreciated that the arrangements of terminal pins and shrouds described above could be used in any inline coupler where it is desired to prevent connection to the terminal pin prior to a predefined rotation of a grip ring. The actual grip ring or clamping arrangement used need not be identical to that described and illustrated in FIGS. 1-9.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A moulded electrofusion fitting for connection to a plastics pipeline or spigot, comprising:
    a hollow body formed with a tubular opening that has a longitudinal axis and is adapted to receive an end of the pipeline/spigot inserted in the direction of said axis as a close sliding fit against an internal surface of the opening;
    an electrofusion element formed in the internal surface in the opening spaced from its end;
    fingers on the end of the opening circumferentially spaced around the opening and separated by slots between them;
    cam surfaces defined on the fingers; and
    a grip ring received on the fingers and including corresponding wedge elements adapted to fit said cam surfaces of the fingers, wherein a circumferential flange is formed around the fingers to retain said grip ring on the end thereof, wherein said grip ring is snapped over said flange to assemble the fitting, temporarily inwardly deflecting the fingers to permit such insertion,
    wherein, when a pipeline is inserted in the opening and the grip ring is rotated about said axis, said wedge and cam surfaces engage to press said fingers radially inwardly against the reaction of said grip ring whereby said pipe is gripped by said fingers.

2. A fitting according to claim 1, wherein said electrofusion element terminates before a stop formed in the opening, which stop is adapted to limit insertion of the pipeline in the opening.

3. A fitting according to claim 1, wherein said flange has a surface lying in a radial plane with respect to said axis facing a corresponding surface of said grip ring when disposed on said, whereby said grip ring cannot be withdrawn from the fingers.

4. A fitting according to claim 1, wherein said wedge and cam surfaces are mutually engaging cylindrical or conical ribs on the fingers and grooves in the grip ring, which ribs and grooves are parallel said longitudinal axis.

5. A fitting according to claim 4, wherein, in a clockwise direction of rotation of said grip ring with respect to said opening, looking in the direction of said opening, the inclination of said ribs and groove with respect to the tangent of the circle centered on said axis on which the facing surfaces of the fingers and grip ring otherwise lie, is less than in the anti-clockwise direction.

6. A fitting according to claim 4, wherein said ribs and grooves are arranged so that the deflection of the fingers on rotation of the grip ring is least at a proximal root of the fingers compared with a distal end of the fingers.

7. A fitting according to claim 6, wherein said ribs and grooves are conical surfaces.

8. A fitting according to claim 6, wherein said ribs and grooves are cylindrical surfaces with the axis of the cylinder inclined with respect to said longitudinal axis.

9. A fitting according to claim 5, wherein said conical or cylindrical surface is modified to provide said less inclination in said clockwise direction.

10. A fitting according to claim 1, wherein facing surfaces of the grip ring and fingers between said ribs and grooves is circular cylindrical.

11. A fitting according to claim 1, wherein there are four fingers.

* * * * *